US009491561B2

(12) United States Patent
LeBlanc et al.

(10) Patent No.: US 9,491,561 B2
(45) Date of Patent: Nov. 8, 2016

(54) ACOUSTIC ECHO CANCELLATION WITH INTERNAL UPMIXING

(71) Applicant: Broadcom Corporation, Irvine, CA (US)

(72) Inventors: Wilf LeBlanc, Vancouver (CA); Franck Beaucoup, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 331 days.

(21) Appl. No.: 13/893,883

(22) Filed: May 14, 2013

(65) Prior Publication Data

US 2014/0307882 A1 Oct. 16, 2014

Related U.S. Application Data

(60) Provisional application No. 61/810,792, filed on Apr. 11, 2013.

(51) Int. Cl.
*H04B 3/20* (2006.01)
*H04S 7/00* (2006.01)

(52) U.S. Cl.
CPC ............ *H04S 7/305* (2013.01); *H04S 2400/13* (2013.01)

(58) Field of Classification Search
CPC .... H04M 9/082; H04M 3/002; H04M 3/568; H04M 1/72591; H04M 9/08; H04R 3/02; H04R 3/002; H04R 3/005; H04R 2499/11; H04R 2430/03; H04R 2499/13; H04R 2499/15; H04R 1/1083; H04R 1/1091; H04R 1/406; H04B 3/23; H04B 3/20; H04B 3/234; H04B 3/235; G10L 2021/02082; G10L 21/0208; G10L 21/02; G10L 2021/02166; G10L 19/012; G10L 21/0216; G10L 21/0232; G10L 15/20; G10L 19/00; G10L 2021/02165; G10K 11/16; G10K 11/175; G10K 11/178; G10K 2210/505; G10K 11/002; G10K 11/346; G10K 2210/1081; H03G 3/20; H03G 5/165; H03G 9/025; H03F 2200/03
USPC ......... 381/17, 18, 19, 20, 21, 300, 301, 302, 381/303, 307, 119, 66, 27, 71.1–71.6, 71.9, 381/71.11, 71.12, 26, 318, 86, 92, 94.1, 93, 381/95, 96, 122, 123; 379/406.01–406.16; 700/94; 455/569.1, 570
See application file for complete search history.

(56) References Cited

U.S. PATENT DOCUMENTS 5,828,756 A * 10/1998 Benesty ................ H04M 9/082 379/406.08
6,738,480 B1 * 5/2004 Berthault et al. ............... 381/66
2008/0031466 A1 * 2/2008 Buck et al. ...................... 381/66
2010/0296672 A1 * 11/2010 Vickers .................. H04H 60/04 381/119

OTHER PUBLICATIONS

Vickers, Earl, "Frequency-Domain Two- to Three-Channel Upmix for Center Channel Derivation and Speech Enhancement", 2009, 24 pages.

* cited by examiner

*Primary Examiner* — Leshui Zhang
(74) *Attorney, Agent, or Firm* — Fiala & Weaver P.L.L.C.

(57) ABSTRACT

Methods, systems, and apparatuses are described for performing acoustic echo cancellation with internal upmixing that allow for a more effective handling of acoustic echo cancellation of audio components that are provided via different channels. In an embodiment in which audio is played back using two loudspeakers, audio components that are panned equally among the loudspeakers form a "phantom center image." Acoustic echo cancellation is performed by initially upmixing the different channels to internally create modified versions of these channels and a virtual channel representative of the phantom center image. Each of these channels is passed through a respective adaptive filter that is configured to estimate an acoustic echo produced by each respective channel. These estimates are then subtracted from the signal received from one or more microphones (or from a signal obtained by combining multiple microphone signals) to suppress or eliminate the acoustic echo.

20 Claims, 6 Drawing Sheets

ACOUSTIC ECHO CANCELLATION WITH INTERNAL UPMIXING

CROSS REFERENCE TO RELATED APPLICATION

This application claims priority to U.S. Provisional Application Ser. No. 61/810,792, filed Apr. 11, 2013, the entirety of which is incorporated by reference herein.

BACKGROUND

Technical Field

The present invention relates to signal processing, and in particular, acoustic echo cancellation.

Background Art

Acoustic echo is generated when audio signals that are played from a loudspeaker system are picked up by microphones(s). In a speakerphone or audio teleconferencing system, such echo may be attributable to speech signals representing the voices of one or more far end speakers that are played back by the system. In a video game system, acoustic echo may also be attributable to music, sound effects, and/or other audio content produced by a game as well as the voices of other players when online interaction with remote players is supported. Acoustic echo may also be attributable to multi-channel audio being streamed for playback by a mobile device, such as smart phone or tablet. If acoustic echo is not cancelled and/or suppressed, the far end speaker(s) will hear an echo of his or her own voice, which may inhibit natural, continuous conversation. Moreover, in a system that supports speech recognition, voice commands may be misinterpreted with the presence of acoustic echo.

Many schemes to cancel and/or suppress acoustic echo have been proposed. However, these schemes are generally computationally complex, and therefore result in relatively high power consumption. Some acoustic echo cancellation and/or suppression schemes attempt to cancel and/or suppress acoustic echo generated by each of a plurality of channels used to play back audio signals. In accordance with such schemes, as the number of channels used to play back audio signals increases, so does the computational complexity and power consumption.

BRIEF SUMMARY

Methods, systems, and apparatuses are described for performing acoustic echo cancellation with internal upmixing, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
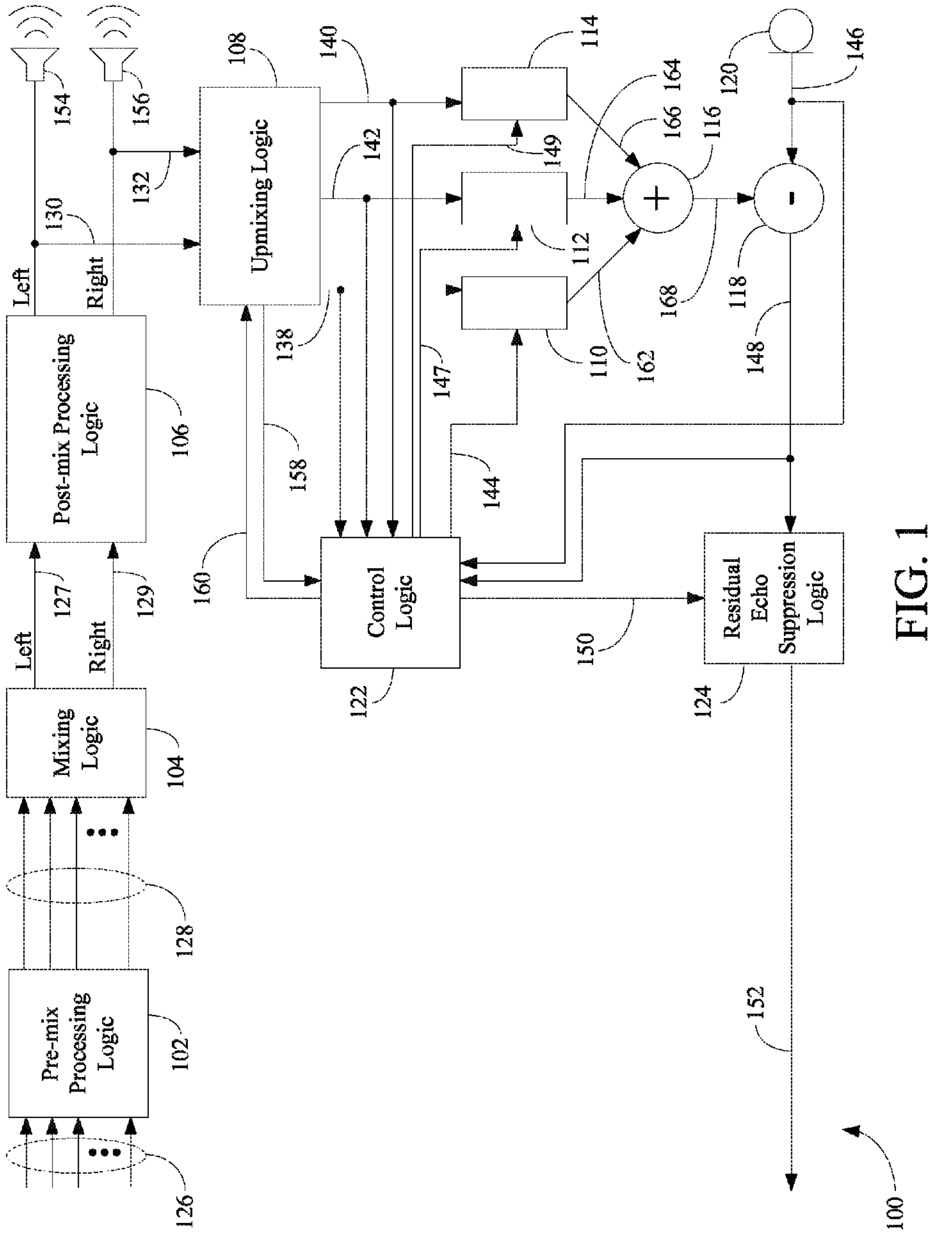
FIG. 1 depicts a block diagram of a system for performing acoustic echo cancellation, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

A system, method and apparatus for performing acoustic echo cancellation with internal upmixing is described herein. The system, method and apparatus allow for a more effective handling of acoustic echo cancellation of audio components that are provided via different channels (e.g., a left and right channel). In an embodiment in which audio is played back using two loudspeakers, audio components that are panned equally among the loudspeakers form a "phantom center image." Acoustic echo cancellation is performed by initially upmixing the different channels to internally create modified versions of these channels and a virtual channel representative of the phantom center image. Each of these channels (i.e., the modified left and right channels and the virtual channel) is passed through a respective adaptive filter, where each adaptive filter is configured to estimate an acoustic echo produced by each respective channel. These estimates are then subtracted from a signal received from each of one or more microphones (or from a signal obtained by combining multiple microphone signals) to reduce or eliminate the acoustic echo. Each of the adaptive filters and/or the upmixing may be selectively enabled and disabled based on properties, such as a level or activity, of their respective reference signal, thereby reducing the computational complexity and the power consumed by the acoustic echo cancellation operations.

In particular, an apparatus for performing acoustic echo cancellation is described herein. The apparatus includes upmixing logic, adaptive filter(s) and combination logic. The upmixing logic is configured to upmix a first plurality of output audio signals into a second plurality of output audio signals. The second plurality of output audio signals comprises more audio signals than the first plurality of output audio signals. A respective adaptive filter corresponding to each of the second plurality of output audio signal is configured to generate an estimated acoustic echo associated with a respective one of the second plurality of output audio signals. The combination logic is configured to combine the estimated acoustic echo associated with each of the second plurality of output audio signals with an input audio signal to generate an echo-cancelled audio signal.

A method for performing acoustic echo cancellation is also described herein. In accordance with the method, a first plurality of output audio signals is upmixed into a second plurality of output audio signals. The second plurality of output audio signals comprises more audio signals than the first plurality of output audio signals. An estimated acoustic echo is generated for one or more output audio signals of the second plurality of output audio signals by one or more respective adaptive filters each corresponding to a respective one of the one or more output audio signals of the second plurality of output audio signals. The estimated acoustic echo associated with each of the second plurality of output audio signals is combined with an input audio signal to generate an echo-cancelled audio signal.

A computer readable storage medium having computer program instructions embodied in said computer readable storage medium for enabling a processor to perform acoustic echo cancellation in a system including a plurality of adaptive filters is also described herein. The computer program instructions includes instructions executable to perform operations. In accordance with the operations, a first plurality of output audio signals is upmixed into a second plurality of output audio signals. The second plurality of output audio signals comprises more audio signals than the first plurality of output audio signals. An estimated acoustic echo is generated for one or more output audio signals of the second plurality of output audio signals by one or more respective adaptive filters each corresponding to a respective one of the one or more output audio signals of the second plurality of output audio signals. The estimated acoustic echo associated with each of the second plurality of output audio signals is combined with an input audio signal to generate an echo-cancelled audio signal.

Example Systems and Methods for Acoustic Echo Cancellation with Internal Upmixing FIG. 1 depicts a block diagram of a system 100 for performing acoustic echo cancellation, according to an embodiment. System 100 is operable to receive audio signal(s) from one or more audio sources (e.g., music, television audio, gaming sounds, streamed audio sources, and/or the like) and/or far-end speech, convert the received audio signal(s) into mixed audio channels, upmix the audio channels, and/or perform acoustic echo cancellation on an input audio signal generated by a microphone. As shown in FIG. 1, system 100 includes pre-mix processing logic 102, mixing logic 104, post-mix processing logic 106, upmixing logic 108, adaptive filters 110, 112, and 114, first combination logic 116, second combination logic 118, a microphone 120, control logic 122, residual echo suppression logic 124, and loudspeakers 154 and 156. Loudspeakers 154 and 156 may be situated either internally or externally to system 100. System 100 may be implemented as part of a device or system, such as, but not limited to, a cell phone, a tablet, a personal data assistant (PDA), a laptop computer, a handheld computer, a desktop computer, a video game system, and/or the like.

Pre-mix processing logic 102 may be configured to receive one or more audio signals 126 and process audio signals(s) 126, for example, by modifying volume levels, applying compression (e.g., if a signal is too large), applying automatic gain control (AGC), etc, thereby producing audio signal(s) 128. After pre-mix processing is complete, audio signals(s) 128 may be provided to mixing logic 104.

Mixing logic 104 may be configured to combine audio signals(s) 128 into one or more channels, for example, by manipulating the signal levels, spectral content, dynamics, panoramic position, etc. of the audio signal(s). For example, in an embodiment, mixing logic 104 is configured to combine audio signals(s) 128 into a two-channel stereo signal comprising a left and right channel signal. As shown in FIG. 1, audio signal(s) 128 are mixed into a stereo signal that includes a left channel signal 127 and a right channel signal 129. After mixing is complete, the channels(s) may be provided to post-mix processing logic 106.

Post-mix processing logic 106 may be configured to process the channel(s) (e.g., left channel signal 127 and right channel signal 129), for example, by applying compression (in addition to or in lieu of applying compression during pre-mix processing) and/or modifying at least one of the channels (e.g., by adding distortion, noise, etc.) to ensure that each channel is distinguishable. If the channels are not distinguishable, it will be difficult to determine the amount of acoustic echo that is attributable to each channel.

After post-mix processing is complete, each channel (e.g., left channel signal 130 and right channel signal 132) is separately output to a respective loudspeaker (e.g., loudspeakers 154 and 156). The channel(s) may also be provided to upmixing logic 108. Upmixing logic 108 may be configured to upmix the channel(s) into a greater number of channels. For example, in an embodiment, where the channel(s) provided to upmixing logic 108 comprise left channel signal 130 and right channel signal 132 of a stereo signal, upmixing logic 108 upmixes left channel signal 130 and right channel signal 132 into three or more channels. As shown in FIG. 1, upmixing logic 108 upmixes left channel signal 130 and right channel signal 132 into three channels 138, 140 and 142. Channel 138 is a modified version of left channel signal 130, channel 140 is a modified version of right channel signal 132 and channel 142 is a virtual center channel (also known as a "phantom center" channel) that is derived from left channel signal 130 and right channel 132. In an embodiment, upmixing logic 108 is configured to assign components of left channel signal 130 and right channel signal 132 that are determined to be correlated (i.e., the phantom center components) to channel 142, assign components of left channel signal 130 that are not correlated to right channel signal 132 to channel 138, and assign components of right channel signal 132 that are not correlated to left channel signal 130 to channel 140. Phantom center components typically comprise far-end speech received from an audio call, dialog in a movie track, lead vocals in a music track and/or the like.

In an example embodiment, upmixing logic 108 is configured to determine channel 142, channel 138, and channel 140 in accordance with Equations 1, 2, and 3, respectively:

$$CC=((L+R)\times\|CC\|)/(\|L+R\|+\epsilon), \quad \text{Equation 1}$$

$$L'=L-\sqrt{0.5}\times CC, \quad \text{Equation 2}$$

$$R'=R-\sqrt{0.5}\times CC, \quad \text{Equation 3}$$

where CC represents channel 142, L represents left channel signal 130, R represents right channel signal 132, L' represents channel 138, R' represents channel 140, and ϵ represents a very small number (e.g., a non-zero number) intended to prevent division by zero. '|| ||' denotes a vector magnitude (or the square root of the autocorrelation of a signal with itself). For example, in an embodiment, ||CC|| may be determined in accordance with Equation 4:

$$\|CC\|=\sqrt{0.5}\times(\|(L+R)\|-\|(L-R)\|), \quad \text{Equation 4}$$

It is noted that in accordance with other embodiments, upmixing logic 108 may determine channels 138, 140, and 142 using other methods as would be apparent to persons skilled in the relevant art(s) having the benefit of this disclosure.

In an embodiment, upmixing logic 108 may also be configured to upmix the channel(s) into a greater number of upmixed channels such that the upmixed channels are downmixable to reconstruct the channel(s) provided to upmixing logic 108. In one embodiment, the upmixed channel(s) may be downmixable to provide perfect reconstruction of the channel(s) provided to upmixing logic 108 (i.e., the reconstructed channel(s) are exactly the same as the channel(s) provided to upmixing logic 108). In another embodiment, the upmixed channel(s) may be downmixable to provide near-perfect reconstruction of the channel(s) provided to upmixing logic 108 (i.e., the reconstructed channel(s) are approximately the same as the channel(s) provided to upmixing logic 108, for example, the reconstructed channel(s) may contain inaudible distortion that was not present in the channel(s) provided to upmixing logic 108).

Upmixing logic 108 may be configured to adaptively upmix the channel(s) provided to upmixing logic 108 into a greater number of upmixed channels based on spatial properties of the channel(s) provided to upmixing logic 108. For example, as will be described below, in one embodiment, upmixing logic 108 may be configured to adaptively enable and disable the upmixing of channels performed by upmixing logic 108 based on the spatial properties of the channel(s) provided to upmixing logic 108.

In an embodiment, channel(s) that are upmixed adaptively may be downmixable in a fixed manner. As will be described below, adaptive filters may be used to model acoustic echo. Utilizing channel(s) that are downmixable in a fixed manner has been observed to assist the adaptive filters in the upmix domain (e.g., adaptive filters 110, 112 and 114 as shown in FIG. 1) in converging to a set of coefficients that model the acoustic echo in a way that is independent of the time-varying upmixing. In another embodiment, upmixing logic 108 is configured to adaptively upmix the channel(s) provided to upmixing logic 108 into a greater number of upmixed channels in at least one of a time domain or a frequency domain.

Adaptive filters 110, 112 and 114, first combination logic 116 and second combination logic 118 may be operable to cancel acoustic echo that is generated when system 100 plays back audio signals (e.g., via speakers 154 and 156) and picks up the audio signals by microphone 120. Each of adaptive filters 110, 112 and 114 may be configured to estimate an acoustic echo associated with a respective channel. For example, adaptive filter 110 may be configured to estimate an acoustic echo associated with channel 138, adaptive filter 112 may be configured to estimate an acoustic echo associated with channel 142, and adaptive filter 114 may be configured to estimate an acoustic echo associated with channel 140.

In one embodiment, each of adaptive filters 110, 112 and 114 are finite impulse response (FIR) filters that produce an estimate of an acoustic echo associated with a respective channel, where each of adaptive filters 110, 112, and 114 utilizes filter coefficients (e.g., computed by control logic 122) that are used to filter a respective channel.

Each of adaptive filters 110, 112 and 114 produce an acoustic echo estimate 162, 164, and 166, respectively, associated with the respective channel and then outputs the estimated acoustic echo to first combination logic 116. In an embodiment where upmixing is enabled, first combination logic 116 may be configured to combine each of acoustic echo estimates 162, 164 and 166 provided by each of adaptive filters 110, 112 and 114 to generate a combined acoustic echo estimate 168. In accordance with this embodiment, first combination logic 116 adds each estimated acoustic echo 162, 164 and 166 together to generate combined acoustic echo estimate 168.

In an embodiment where upmixing is disabled, first combination logic 116 may be configured to combine each of acoustic echo estimates 162 and 166 provided by each of adaptive filters 110 and 114 to generate combined acoustic echo estimate 168. In accordance with this embodiment, first combination logic 116 adds each estimated acoustic echo 162 and 166 together to generate combined acoustic echo estimate 168.

A combined acoustic echo estimate for adaptive filters 110 and 114 when upmixing is disabled may be defined by Equation 5:

$$\text{echoEstimate}=H_L*L+H_R*R, \quad \text{Equation 5}$$

where $H_L$ corresponds to adaptive filter 110 when upmixing is disabled, $H_R$ corresponds to adaptive filter 114 when upmixing is disabled, and '*' represents a convolution operation. L and R may each be represented as a function of the signals in the upmix domain as shown by Equation 6:

$$\text{echoEstimate}=H_L*(D_{L',L}L'+D_{CC,L}CC+D_{R',L}R')+H_R*(D_{L'R}L'+D_{CC,R}CC+D_{R',R}R'), \quad \text{Equation 6}$$

where $D_{L',L}$ represents the downmix coefficient associated with the contribution of L (e.g., left channel signal 130) to the modified channel L' (e.g., channel 138), $D_{CC,L}$ represents the downmix coefficient associated with the contribution of L to the virtual center channel CC (e.g., channel 142), $D_{R',L}$ represents the downmix coefficient associated with the contribution of L to the modified channel R' (e.g., channel 140), $D_{L',R}$ represents the downmix coefficient associated with the contribution of R (e.g., right channel signal 132) to the modified channel L',$D_{CC,R}$ represents the downmix coefficient associated with the contribution of R to the virtual center channel CC, and $D_{R',R}$ represents the downmix coefficient associated with the contribution of R to the modified channel R'.

In an embodiment, the values for $D_{L',L}$, $D_{CC,L}$, $D_{R',L}$, $D_{L',R}$, $D_{CC,R}$, and $D_{R',R}$ may be equal to 1, $\sqrt{0.5}$, 0, 0, $\sqrt{0.5}$, and 1, respectively Expanding out the convolution operation and modifying Equation 6 in terms of L', CC and R' yields Equation 7, which may be used to determine the combined acoustic echo estimate for adaptive filters 110, 112 and 114 when upmixing is enabled:

$$\text{echoEstimate}=(D_{L',L}H_L+D_{L',R}H_R)*L'+(D_{CC,L}H_L+D_{CC,R}H_R)*CC+(D_{R',L}H_L+D_{R',R}H_R)*R', \quad \text{Equation 7}$$

Combined acoustic echo estimate 168 may be provided to second combination logic 118. Second combination logic 118 may be configured to combine an input audio signal 146 generated by microphone 120 and combined acoustic echo estimate 168 provided by first combination logic 116 to generate an echo-cancelled audio signal 148. In an embodiment, second combination logic 118 subtracts combined acoustic echo estimate 168 from input audio signal 146 generated by microphone 120. Echo-cancelled audio signal 148 is fed back to control logic 122 to adapt each of adaptive filters 110, 112 and 114 by adjusting the filter coefficients of each adaptive filter 110, 112 and 114.

The echo cancellation process may sometimes result in what is referred to as a residual echo. The residual echo comprises acoustic echo that is not completely removed by the echo cancellation process (i.e., the process performed by adaptive filters 110, 112 and 114, first combination logic 116 and second combination logic 118 as previously described). This may occur as a result of a deficient length of at least one of adaptive filters 110, 112 and 114, a mismatch between a true and an estimated acoustic echo, and/or non-linear signal components that were not cancelled, for example. To eliminate the residual echo, echo-cancelled audio signal 148 may be provided to residual echo suppression logic 124, which is configured to perform a residual echo suppression process, for example, a non-linear processing (NLP) function, to suppress the residual echo. The resulting output audio signal (e.g., signal 152) is provided for transmission to, for example, a far-end party, or a speech recognition engine that receives voice commands (e.g., for music play-back).

Control logic 122 may be configured to selectively enable and disable each of adaptive filters 110, 112 and/or 114. In certain instances, components of left channel signal 130 and right channel signal 132 may be correlated to such an extent that most (if not all) of the components of left channel signal 130 and right channel signal 132 may be upmixed to the virtual center channel (e.g., channel 142), thereby rendering the associated modified left channel (e.g., channel 138) and modified right channel (e.g., channel 140) effectively inactive. Because these channels are effectively inactive, running echo cancellation (via adaptive filters 110 and 114, respectively) on these channels would result in a waste of computation and power. To prevent these drawbacks, control logic 122 may selectively disable the adaptive filters corresponding to channels that are deemed inactive. In certain cases, such as the one described above, the computational complexity would then match that of an echo cancellation operation of a mono signal because only a single adaptive filter would be enabled.

In one embodiment, control logic 122 may be configured to selectively enable and disable an adaptive filter based on one or more characteristics (e.g., a signal level) of a channel provided by upmixing logic 108. For example, in one embodiment, control logic 122 is configured to determine whether a signal level of any of channels 138, 140, and 142 is less than a predetermined threshold. In response to determining that a signal level of a particular channel is less than the predetermined threshold, control logic 122 may provide an indicator to the adaptive filter corresponding to the particular channel that causes the adaptive filter to be disabled. For example, if the signal level of channel 138 is less than the predetermined threshold, control logic 122 provides indicator 144 to adaptive filter 110 that causes adaptive filter 110 to be disabled. If the signal level of channel 140 is less than the predetermined threshold, control logic 122 provides indicator 147 to adaptive filter 114 that causes adaptive filter 114 to be disabled. If the signal level of channel 142 is less than the predetermined threshold, control logic 122 provides indicator 149 to adaptive filter 112 that causes adaptive filter 112 to be disabled. Each of channels 138, 140 and 142 may be selectively enabled and disabled in accordance with the same predetermined threshold or a different predetermined threshold.

After disabling a particular adaptive filter, control logic 122 may continue to monitor the signal level of the corresponding channel to determine whether the signal level becomes greater than or equal to the predetermined threshold. In response to determining that the signal level of the particular channel becomes greater than or equal to the predetermined threshold, control logic 122 may provide the respective indicator to the adaptive filter corresponding to the particular channel that causes the adaptive filter to be enabled.

In another embodiment, control logic 122 is configured to selectively enable and disable an adaptive filter based on the relative signal levels of channel(s) 138, 140 and 142. For example, control logic 122 may be configured to determine whether a difference between a signal level of any of channels 138, 140, and 142 is greater than or equal to a predetermined threshold. In response to determining that the difference is greater than or equal to the predetermined threshold, control logic 122 may provide the respective indicator to the adaptive filter corresponding to the particular channel having the lower signal level, which causes the adaptive filter to be disabled. Each of channels 138, 140 and 142 may be selectively enabled and disabled in accordance with the same predetermined threshold or a different predetermined threshold.

After disabling a particular adaptive filter, control logic 122 may continue to monitor the signal levels to determine whether the difference between the signal level of the channel corresponding to the disabled adaptive filter and the signal level(s) of the other channels is less than the predetermined threshold. In response to determining that the difference for the channel corresponding to the disabled adaptive filter is less than the predetermined threshold, control logic 122 may provide the respective indicator to the disabled adaptive filter that causes the adaptive filter to be enabled.

In yet another embodiment, control logic 122 is configured to selectively enable and disable an adaptive filter based on estimated residual echo levels produced by channel(s) 138, 140 and 142 in addition to or in lieu of the characteristic(s) of channel(s) 138, 140 and 142. In one embodiment, control logic 122 determines the estimated residual echo for a particular channel by estimating an echo return loss (ERL) for the particular channel under appropriate conditions (e.g., when a near-end party is not speaking). The ERL for channel 138 may be determined by subtracting the signal level of input audio signal 146 received from microphone 120 from the signal level of channel 138. The ERL for channel 140 may be determined by subtracting the signal level of input audio signal 146 received from microphone 120 from the signal level of channel 140. The ERL for channel 142 may be determined by subtracting the signal level of input audio signal 146 received from microphone 120 from the signal level of channel 142. In another embodiment, the estimated level of residual echo for a particular channel is determined by determining the ERL enhancement (ERLe) of the particular channel, which represents the increase in the ERL when an adaptive filter corresponding to the particular channel is enabled. The ERLe for a particular channel may be determined by determining the difference of signal level between input audio signal 146 and echo-cancelled audio signal 148. The ERLe is periodically tracked to obtain a history that can be used to predict the performance of each adaptive filter 110, 112, and 114 (i.e., an estimate of the amount of echo cancellation that is obtained by a particular adaptive filter can be predicted).

The estimated residual echo may be based on either ERL, ERLe, and/or a combination of both. If the estimated residual echo level for a particular adaptive filter is less than a predetermined threshold, then control logic 122 provides the respective indicator to the particular adaptive filter that causes the particular adaptive filter to be disabled.

After disabling the particular adaptive filter, control logic 122 determines the estimated residual echo level of the channel that would occur if the particular adaptive filter is re-enabled. If the estimated residual echo level of the channel corresponding to the particular adaptive filter is greater than or equal to the predetermined threshold, control logic 122 may provide the respective indicator to the adaptive filter corresponding to the particular channel that causes the adaptive filter to be enabled.

In an embodiment, control logic 122 provides estimated residual echo level 150 to residual echo suppression logic 124. Residual echo suppression logic 124 may suppress echo by an amount specified by estimated residual echo level 150.

Control logic 122 may be also be configured to selectively enable and disable upmixing logic 108 (or a portion thereof) based on spatial properties of channels 130 and 132. A determination to selectively enable and disable upmixing logic 108 may be made based on a measure of correlation 158 between the components of channels 130 and 132. If measure of correlation 158 between the components of channel 130 and 132 indicates that channel 130 and 132 are highly uncorrelated, this means that there would be no components of channels 130 and 132 that are to be panned to the virtual center channel (e.g., channel 142). In other words, the channels resulting from an upmixing operation would effectively be the same as the channels provided to upmixing logic 108. Thus, running upmixing logic 108 under such circumstances would result in little to no benefit and an unnecessary usage of power. To prevent such drawbacks, control logic 122 provides a determination 160 that causes upmixing logic 108 to not upmix channels 130 and 132 to channels 138, 140 and 142 in response to receiving measure of correlation 158 that indicates that channel 130 and 132 are highly correlated. In this case, upmixing logic provides channel 130 onto channel 138 and provides channel 132 onto channel 140 without any upmixing (i.e., the upmixing operations are bypassed).

Upmixing logic 108 continuously determines measure of correlation 158 between the channel(s) received. Thus, for example, when left channel signal 130 and right channel signal 132 contain correlated components (i.e., components to be panned to a virtual center channel), control logic 122 may provide determination 160 that causes upmixing logic 108 to upmix left channel signal 130 and right channel signal 132 to channels 138, 140, and 142.

Because system 100 can adaptively switch from disabling upmixing to enabling upmixing, the signal being operated on by a respective adaptive filter can vary. For example, when upmixing is disabled, adaptive filter 110 operates on left channel signal 130 (L), adaptive filter 112 does not operate on any channel signal (i.e., adaptive filter 112 is turned off), and adaptive filter 114 operates on right channel signal 132 (R). However, when upmixing is enabled, adaptive filter 110 operates on a modified (i.e., an upmixed) version of left channel signal (i.e., channel 138 (L')), adaptive filter 112 operations on channel 142 (CC), and adaptive filter 114 operates on a modified (i.e., an upmixed) version of right channel signal (i.e., channel 140 (R')).

To provide a seamless transition when enabling upmixing, a mapping between the coefficients of adaptive filters 110 and 114 (when upmixing is disabled) and adaptive filters 110, 112 and 114 (when upmixing is enabled) may be performed to determine an initial state for adaptive filters 110, 112 and 114 when upmixing is enabled. In an embodiment, adaptive filters 110 and 114 (or their associated filter coefficients) can be mirrored during this transition.

For example, as is apparent from Equation 7 (provided above), adaptive filters 110, 112, and 114 (when upmixing is enabled) may be defined in accordance to Equations 8, 9 and 10, respectively, as shown below:

$$H_{L'}=D_{L',L}H_L+D_{L',R}H_R, \qquad \text{Equation 8}$$

$$H_{CC}=D_{CC,L}H_L+D_{CC,R}H_R, \qquad \text{Equation 9}$$

$$H_{R'}=D_{R',L}H_L+D_{R',R}H_R, \qquad \text{Equation 10}$$

where $H_L'$, $H_{CC}$, and $H_R'$ represent adaptive filters 110, 112 and 114, respectively, when upmixing is enabled.

A matrix formulation of Equations 8, 9 and 10 may be defined in accordance to the Equation 11:

$$\begin{bmatrix} H_{L'} \\ H_{CC} \\ H_{R'} \end{bmatrix} = \begin{bmatrix} D_{L',L} & D_{L',R} \\ D_{CC,L} & D_{CC,R} \\ D_{R',L} & D_{R',R} \end{bmatrix} \begin{bmatrix} H_L \\ H_R \end{bmatrix} = D\begin{bmatrix} H_L \\ H_R \end{bmatrix}, \qquad \text{Equation 11}$$

As is apparent, when applying the example values of the downmix coefficients provided above (i.e., 1, $\sqrt{0.5}$, 0, 0, $\sqrt{0.5}$, and 1, respectively) to Equation 11, $H_L$ mirrors the $H_L'$, and $H_R$ mirrors the $H_R'$.

To provide a seamless transition when disabling upmixing, a mapping between the coefficients of the adaptive filters 110, 112, 114 (when upmixing is enabled) and adaptive filters 110 and 114 (when upmixing is disabled) may be performed to determine an initial state for adaptive filters 110 and 114. In an embodiment, the mapping may be performed by inverting the mirroring described above, which is shown in Equation 12:

$$\begin{bmatrix} H_L \\ H_R \end{bmatrix} = (D'D)^{-1}D'\begin{bmatrix} H_{L'} \\ H_{CC} \\ H_{R'} \end{bmatrix}, \qquad \text{Equation 12}$$

In an embodiment, where $(D'D)^{-1}D'$ corresponds to the following matrix of values:

$$\begin{bmatrix} 3/4 & \sqrt{0.5}/2 & -1/4 \\ -1/4 & \sqrt{0.5}/2 & 3/4 \end{bmatrix},$$

it becomes apparent that $H_{L'}$ mirrors $H_L$, and $H_{R'}$ mirrors the $H_R$, as shown in Equation 13:

$$\begin{bmatrix} H_L \\ H_R \end{bmatrix} = \begin{bmatrix} H_{L'} \\ H_{R'} \end{bmatrix}, \quad \text{Equation 13}$$

Figure 2:
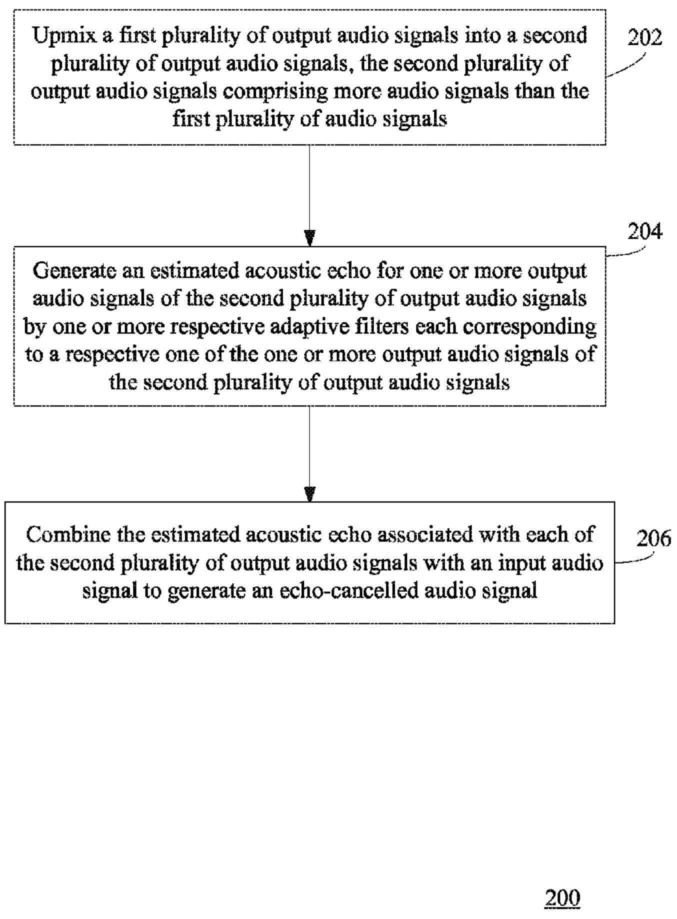
FIG. 2 shows a flowchart providing example steps for performing acoustic echo cancellation, according to an example embodiment.

Accordingly, in embodiments, system 100 may operate in various ways to perform acoustic echo cancellation on channels 138, 140 and/or 142. For instance, FIG. 2 shows a flowchart 200 providing example steps for performing acoustic echo cancellation, according to an example embodiment. Flowchart 200 will be described with reference to system 100 of FIG. 1. Other structural and operational embodiments will be apparent to persons skilled in the relevant art(s) based on the discussion regarding flowcharts 200 and system 100.

Flowchart 200 may begin with step 202. In step 202, a first plurality of output audio signals are upmixed into a second plurality of output audio signals, where the second plurality of output audio signals comprise more audio signals than the first plurality of audio signals. For example, with reference to FIG. 1, upmixing logic 108 upmixes left channel signal 130 and right channel signal 132 into channels 138, 140 and 142.

In an embodiment, upmixing logic 108 is configured to assign components of left channel signal 130 and right channel signal 132 that are determined to be correlated (i.e., the phantom center components) to channel 142, assign components of left channel signal 130 that are not correlated to right channel signal 132 to channel 138, and assign components of right channel signal 132 that are not correlated to left channel signal 130 to channel 140.

In another embodiment, upmixing logic 108 is configured to adaptively enable and disable the upmixing of the first plurality of output audio signals into the second plurality of output audio signals based on spatial properties of the first plurality of output audio signals.

In yet another embodiment, the first plurality of output audio signals are upmixed to the second plurality of output audio signals such that the second plurality of output audio signals are downmixable to reconstruct the first plurality of output audio signals. In one embodiment, the second plurality of output audio signals may be downmixable to provide perfect reconstruction of the first plurality of output audio signals. In another embodiment, the second plurality of output audio signals may be downmixable to provide a near-perfect reconstruction of the first plurality of output audio signals.

In still yet another embodiment, the first plurality of output audio signals are upmixed to the second plurality of output audio signals in at least one of a time domain or a frequency domain.

In step 204, an estimated acoustic echo is generated for one or more output audio signals of the second plurality of output audio signals by one or more respective adaptive filters each corresponding to a respective one of the one or more output audio signals of the second plurality of output audio signals. For example, with reference to FIG. 1, adaptive filter 110 may generate estimated acoustic echo 162 for channel 138, adaptive filter 112 may generate estimated acoustic echo 164 for channel 142, and adaptive filter 114 may generate estimated acoustic echo 166 for channel 140.

In one embodiment, an adaptive filter associated with one of the second plurality of output audio signals is disabled or enabled based at least on characteristic(s) of the one of the second plurality of output audio signals. For example, with reference to FIG. 1, control logic 122 may provide an indicator that causes at least one of adaptive filters 110, 112 and 114 to be disabled or enabled. In one embodiment, control logic 122 is configured to selectively enable and disable an adaptive filter based on a signal level of an audio signal of the second plurality of output audio signals (e.g., channels 138, 140 and 142) that corresponds to the adaptive filter. In another embodiment, control logic 122 is configured to selectively enable and disable an adaptive filter based on the relative signal levels of the second plurality of output audio signals.

In step 206, the estimated acoustic echo associated with each of the second plurality of output audio signals are combined with an input audio signal to generate an echo-cancelled audio signal.

In one embodiment, the input audio signal is generated by a microphone. For example, with reference to FIG. 1, input audio signal 146 is generated by microphone 146. In another embodiment, the input audio signal is generated by one or more microphones, as will be described below with reference to FIGS. 4 and 5. In yet another embodiment, the input audio signal is generated by a beamformer, as will be described below with reference to FIG. 5.

Figure 3:
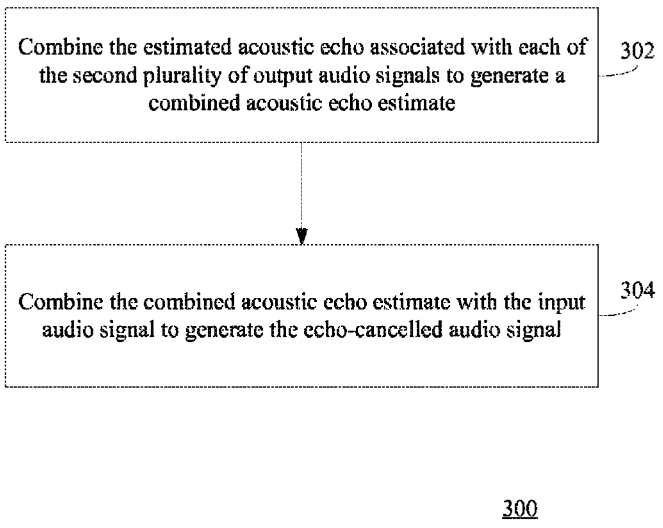
FIG. 3 shows a flowchart providing example steps for combining an estimated acoustic echo with an input audio signal, according to an example embodiment.

FIG. 3 shows a flowchart 300 providing example steps for combining an estimated acoustic echo with an input audio signal, according to an example embodiment. Flowchart 300 will be described with reference to system 100 of FIG. 1. Other structural and operational embodiments will be apparent to persons skilled in the relevant art(s) based on the discussion regarding flowcharts 300 and system 100.

Flowchart 300 may begin with step 302. In step 302, the estimated acoustic echo associated with each of the second plurality of output audio signals are combined to generate a combined acoustic echo estimate. For example, with reference to FIG. 1, first combination logic 116 combines estimated acoustic echoes 162, 164 and 166 to generate combined acoustic echo estimate 168. In an embodiment, first combination logic 116 adds estimated acoustic echoes 162, 164 and 166 together to generate combined acoustic echo estimate 168.

In step 304, the combined acoustic echo estimate is combined with the input audio signal to generate the echo-cancelled audio signal. For example, with reference to FIG. 1, second combination logic 118 combines combined acoustic echo estimate 168 with input audio signal 146 (e.g., generated by microphone 120) to generate echo-cancelled audio signal 148. In an embodiment, second combination logic 118 subtracts combined acoustic echo estimate 168 from input audio signal 146 generated by microphone 120 to generate the echo-cancelled audio signal.

Figure 4:
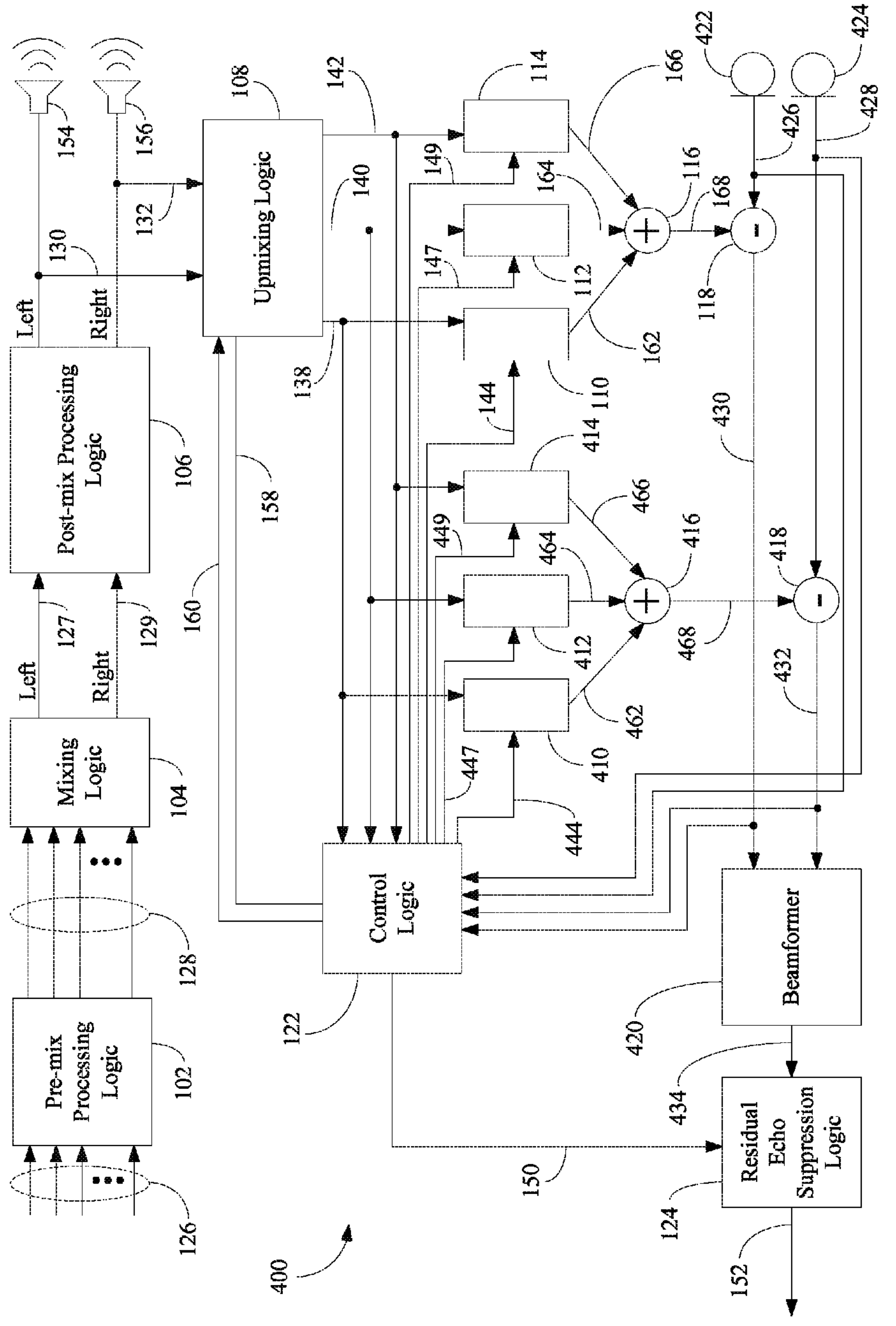
FIG. 4 depicts a block diagram of a system for performing acoustic echo cancellation for input audio signals generated from a plurality of microphones, according to an example embodiment.

FIG. 4 depicts a block diagram of a system 400 for performing acoustic echo cancellation for input audio signals generated from a plurality of microphones, according to an embodiment. As shown in FIG. 4, in addition to the system components depicted in FIG. 1, system 400 includes adaptive filters 410, 412 and 414, third combination logic 416, fourth combination logic 418, a beamformer 420 and microphones 422 and 424.

Adaptive filters 110, 112 and 114, first combination logic 116 and second combination logic 118 may be operable to cancel acoustic echo that is generated when system 100 plays back audio signals (e.g., via speakers 154 and 156) and picks up the audio signals by microphone 422. Adaptive filters 410, 412 and 414, third combination logic 416 and fourth combination logic 418 may be operable to cancel acoustic echo that is generated when system 100 plays back audio signals (e.g., via speakers 154 and 156) and picks up the audio signals by microphone 424.

For example, as described above, each of adaptive filters 110, 112 and 114 may be configured to estimate an acoustic echo associated with respective channels 138, 140 and 142. The estimated acoustic echo determined by each of adaptive filters 110, 112 and 114 (e.g., estimated acoustic echoes 162, 164 and 166) are provided to first combination logic 116, which combines estimated acoustic echoes 162, 164 and 166 to provide combined estimated acoustic echo 168. Combined acoustic echo estimate 168 is provided to second combination logic 118. Second combination logic 118 combines combined acoustic echo 168 with an input audio signal 426 generated by microphone 422 to provide echo-cancelled signal 430.

Similarly, each of adaptive filters 410, 412 and 414 may also be configured to estimate an acoustic echo associated with respective channels 138, 140 and 142. The estimated acoustic echo determined by each of adaptive filters 410, 412 and 414 (e.g., estimated acoustic echoes 462, 464 and 466) are provided to third combination logic 416, which combines estimated acoustic echoes 462, 464 and 466 to provide combined estimated acoustic echo 468. In one embodiment, third combination logic 416 adds estimated acoustic echoes 462, 464 and 466 together to provide combined estimated acoustic echo 468. Combined acoustic echo estimate 468 is provided to fourth combination logic 418. Fourth combination logic 418 combines combined acoustic echo 468 with an input audio signal 428 generated by microphone 424 to provide echo-cancelled signal 432. In one embodiment, fourth combination logic 418 subtracts combined acoustic echo 468 from input audio signal 428 to provide echo-cancelled signal 432. Echo-cancelled signal 432 is fed back to control logic 122 to adapt each of adaptive filters 410, 412 and 414 by adjusting the filter coefficients of each adaptive filter 410, 412 and 414.

In an embodiment, each of adaptive filters 410, 412 and/or 414 is selectively enabled and disabled by control logic 122 in a similar fashion as each of adaptive filters 110, 112 and/or 114. That is, each of adaptive filters may be selectively enabled and disabled based on characteristic(s) of channel(s) 138, 140 and/or 142 and/or an estimated echo or residual echo produced by channel(s) 138, 140 and 142. Adaptive filter 410 may be selectively enabled and disabled via indicator 444, adaptive filter 412 may be selectively enabled and disabled via indicator 447, and adaptive filter 44 may be selectively enabled and disabled via indicator 449.

Beamformer 420 may be configured to receive echo-cancelled signals 430 and 432. Beamformer 420 may be configured to process echo cancelled signals 430 to produce a single beamformed audio signal 434. In producing beamformed audio signal 434, beamformer 420 may perform spatial filtering on echo cancelled signals 430 and 432 to generate a single audio signal with directional properties. For example, echo-cancelled signals 430 and 432 may be combined in such a way that an audio source emanating from a particular direction is emphasized and noise and interference emanating from other directions are rejected.

Beamformer 420 provides beamformed audio signal 434 to residual echo suppression logic 124, which, as described above, is configured to perform a residual echo suppression process. The resulting output audio signal (e.g., signal 152) is provided for transmission to, for example, a far-end party, or a speech recognition engine that receives voice commands (e.g., for music play-back).

Figure 5:
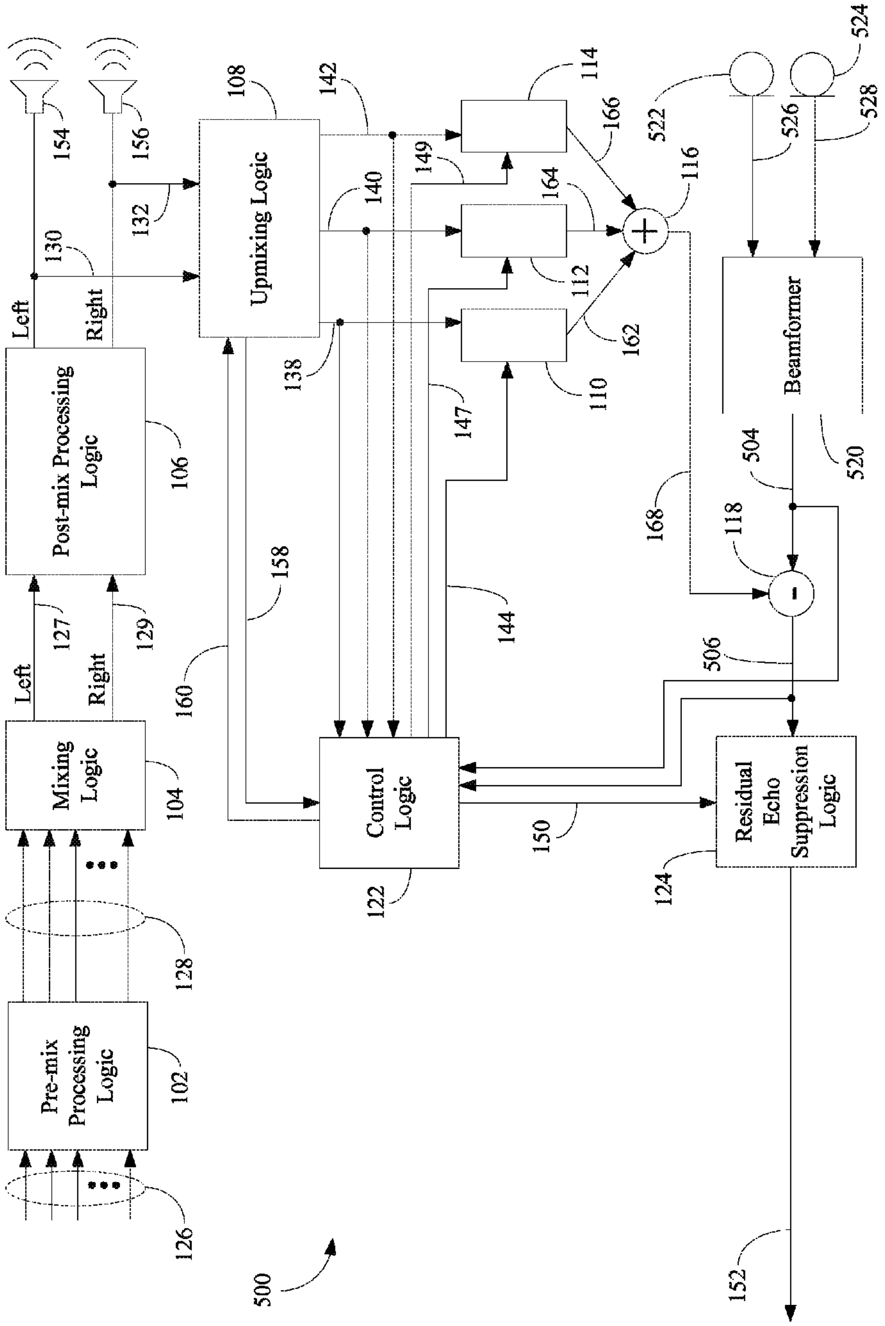
FIG. 5 depicts a block diagram of a system for performing acoustic echo cancellation for input audio signals generated from a plurality of microphones, according to another example embodiment.

FIG. 5 depicts a block diagram of a system 500 for performing acoustic echo cancellation for input audio signals generated from a plurality of microphones, according to another embodiment. As shown in FIG. 5, in addition to the system components depicted in FIG. 1, system 500 includes a beamformer 520 and microphones 522 and 524. As shown in FIG. 5, echo cancellation is performed on a single audio signal provided by beamformer 520 (whereas in FIG. 4, echo cancellation is performed on each input audio signal generated by a respective microphone).

For example, an input audio signal 526 generated by microphone 522 and an input audio signal 528 generated by microphone 524 are provided to beamformer 520. Beamformer 520 may be configured to process input audio signals 526 and 528 to produce a single beamformed audio signal 504 in manner similar to beamformer 420 described above with reference to FIG. 4. Beamformer 520 provides beamformed audio signal 504 to second combination logic 118, which is operable to cancel acoustic echo present in beamformed audio signal 504. For example, second combination logic 118 may be configured to combine beamformed audio signal 504 and combined acoustic echo estimate 168 provided by first combination logic 116 to generate an echo-cancelled audio signal 506. In an embodiment, second combination logic 118 subtracts combined acoustic echo estimate 168 from beamformed audio signal 504 to generate echo-cancelled audio signal 506.

Second combination logic 118 provides echo-cancelled audio signal 506 to residual echo suppression logic 124, which, as described above, is configured to perform a residual echo suppression process. The resulting output audio signal (e.g., signal 152) is provided for transmission to a far-end party.

Example Computer System Implementation

Figure 6:
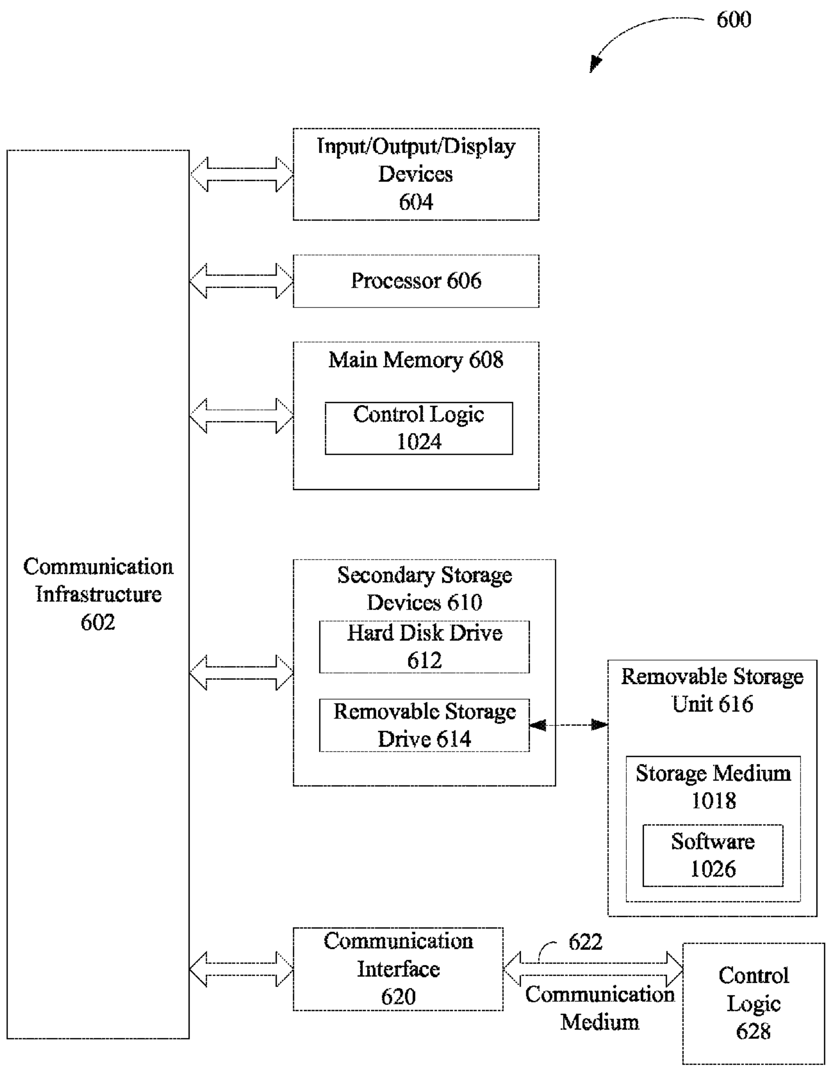
FIG. 6 is a block diagram of an example computer system in which embodiments may be implemented.

The embodiments described herein, including systems, methods/processes, and/or apparatuses, may be implemented using well known computers, such as computer 600 shown in FIG. 6. For example, elements of system 100 including pre-mix processing logic 102, mixing logic 104, post-mix processing logic 106, upmixing logic 108, adaptive filters 110, 112, 114, first combination logic 116, second combination logic 118, control logic 122, residual echo suppression logic 124, and elements thereof; elements of system 400 including adaptive filters 410, 412 and 414, third combination logic 416, fourth combination logic 418, beamformer 420, and elements thereof; elements of system 500 including beamformer 520 and elements thereof; each of the steps of flowchart 200 depicted in FIG. 2; and each of the steps of flowchart 300 depicted in FIG. 3 can each be implemented using one or more computers 600.

Computer 600 can be any commercially available and well known computer capable of performing the functions described herein, such as computers available from International Business Machines, Apple, Sun, HP, Dell, Cray, etc. Computer 600 may be any type of computer, including a desktop computer, a laptop computer, or a mobile device, including a cell phone, a tablet, a personal data assistant (PDA), a handheld computer, and/or the like.

As shown in FIG. 6, computer 600 includes one or more processors (e.g., central processing units (CPUs) or digital signal processors (DSPs)), such as processor 606. Processor 606 may include elements of system 100 including pre-mix processing logic 102, mixing logic 104, post-mix processing logic 106, upmixing logic 108, adaptive filters 110, 112, 114, first combination logic 116, second combination logic 118, control logic 122, residual echo suppression logic 124, and elements thereof; elements of system 400 including adaptive filters 410, 412 and 414, third combination logic 416, fourth combination logic 418, beamformer 420, and elements thereof; elements of system 500 including beamformer 520 and elements thereof; or any portion or combination thereof, for example, though the scope of the example embodiments is not limited in this respect. Processor 606 is connected to a communication infrastructure 602, which may include, for example, a communication bus. In some embodiments, processor 606 can simultaneously operate multiple computing threads.

Computer 600 also includes a primary or main memory 608, such as a random access memory (RAM). Main memory has stored therein control logic 624 (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 626 (control logic) and/or data. Removable storage unit 616 represents a floppy disk, magnetic tape, compact disc (CD), digital versatile disc (DVD), Blu-ray disc, optical storage disk, memory stick, memory card, or any other computer data storage device. Removable storage drive 614 reads from and/or writes to removable storage unit 616 in a well-known manner.

Computer 600 also includes input/output/display devices 604, such as monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 may interface with remote sites or networks via wired or wireless connections. Examples of communication interface 622 include but are not limited to a modem (e.g., for 3G and/or 4G communication(s)), a network interface card (e.g., an Ethernet card for Wi-Fi and/or other protocols), a communication port, a Personal Computer Memory Card International Association (PCMCIA) card, a wired or wireless USB port, etc.

Control logic 628 may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments.

The disclosed technologies may be embodied in software, hardware, and/or firmware implementations other than those described herein. Any software, hardware, and firmware implementations suitable for performing the functions described herein can be used.

Further Example Embodiments

While embodiments described above include systems for performing acoustic echo cancellation based on two to three channel signals and input audio signals generated by one or two microphones, it is noted that in accordance with other embodiments, acoustic echo cancellation may be based on any number of channel signals and input audio signals generated by any number of microphones. Thus, upmixing logic 108 (as depicted in FIGS. 1, 4 and 5) may be configured to upmix channels into any number of upmixed channels (e.g., 5-channel audio, 7-channel audio, etc.). Moreover, the virtual channel generated by upmixing logic 108 is not limited to a virtual center channel. A virtual channel may be generated for any spatial position that is deemed dominant.

Persons skilled in the relevant art(s) will also readily appreciate that the techniques described above for performing acoustic echo cancellation may also be applied to attenuate or cancel other types of echo that may be present in an audio communication system. For example, such techniques may be applied to perform line echo cancellation in an audio communication system.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. An apparatus for performing echo cancellation, comprising:

upmixing logic configured to upmix a first plurality of output audio signals into a second plurality of output audio signals, wherein the second plurality of output audio signals comprises more audio signals than the first plurality of output audio signals, and wherein at least one of the second plurality of output audio signals comprises a first combination of at least two output audio signals of the first plurality of output audio signals;

a respective adaptive filter corresponding to each of the second plurality of output audio signals, wherein each adaptive filter is configured to generate an estimated echo associated with a respective one of the second plurality of output audio signals;

combination logic configured to combine the estimated echo associated with each of the second plurality of output audio signals with an input audio signal to generate an echo-cancelled audio signal; and control logic configured to selectively enable and disable an adaptive filter associated with one of the second plurality of output audio signals based at least on a characteristic of the one of the second plurality of output audio signals.

2. The apparatus of claim 1, wherein the combination logic comprises:

first combination logic configured to combine the estimated echo associated with each of the second plurality of output audio signals to generate a combined echo estimate; and second combination logic configured to combine the combined echo estimate with the input audio signal to generate the echo-cancelled audio signal.

3. The apparatus of claim 1, wherein the first plurality of output audio signals comprises a left channel signal L and a right channel signal R of a stereo signal, and wherein the second plurality of output audio signals comprises a virtual center channel CC, a modified left channel L', and a modified right channel R'.

4. The apparatus of claim 3, wherein the upmixing logic is configured to upmix the left channel signal L and the right channel signal R of the stereo signal to the virtual center channel CC, the modified left channel L', and the modified right channel R' by calculating CC as $$CC=((L+R)\times\|CC\|)/(\|L+R\|+\epsilon)$$, where $\epsilon$ represents a non-zero number calculating L' as $$L'=L-\sqrt{0.5}\times CC,$$

and calculating R' as $$R'=R+\sqrt{0.5}\times CC.$$

5. The apparatus of claim 1, wherein the upmixing logic is configured to upmix the first plurality of output audio signals to the second plurality of output audio signals such that the second plurality of output audio signals are downmixable to reconstruct the first plurality of output audio signals.

6. The apparatus of claim 1, wherein the upmixing logic is configured to adaptively enable and disable the upmixing of the first plurality of output audio signals into the second plurality of output audio signals based on spatial properties of the first plurality of output audio signals.

7. The apparatus of claim 1, wherein the upmixing logic is configured to upmix the first plurality of output audio signals to the second plurality of output audio signals in at least one of a time domain or a frequency domain.

8. The apparatus of claim 1, wherein the input audio signal is generated by one or more microphones.

9. The apparatus of claim 1, wherein the input audio signal is generated by a beamformer.

10. A method for performing echo cancellation, comprising:

upmixing a first plurality of output audio signals into a second plurality of output audio signals, wherein the second plurality of output audio signals comprises more audio signals than the first plurality of output audio signals, and wherein at least one of the second plurality of output audio signals comprises a combination of at least two output audio signals of the first plurality of output audio signals;

generating an estimated echo for one or more output audio signals of the second plurality of output audio signals by one or more respective adaptive filters each corresponding to a respective one of the one or more output audio signals of the second plurality of output audio signals;

combining the estimated echo associated with each of the second plurality of output audio signals with an input audio signal to generate an echo-cancelled audio signal; and selectively enabling and disabling an adaptive filter associated with one of the second plurality of output audio signals based at least on a characteristic of the one of the second plurality of output audio signals.

11. The method of claim 10, wherein said combining comprises:

combining the estimated echo associated with each of the second plurality of output audio signals to generate a combined echo estimate; and combining the combined echo estimate with the input audio signal to generate the echo-cancelled audio signal.

12. The method of claim 10, wherein the first plurality of output audio signals comprises a left channel signal L and a right channel signal R of a stereo signal, and wherein the second plurality of output audio signals comprises a virtual center channel CC, a modified left channel L', and a modified right channel R'.

13. The method of claim 12, wherein said upmixing comprises upmixing the left channel signal L and the right channel signal R of the stereo signal to the virtual center channel CC, the modified left channel L', and the modified right channel R' by calculating CC as $$CC=((L+R)\times\|CC\|)/(\|L+R\|+\epsilon)$$, where $\epsilon$ represents a non-zero number calculating L' as $$L'=L-\sqrt{0.5}\times CC,$$

and calculating R' as $$R'=R<\sqrt{0.5}\times CC.$$

14. The method of claim 10, wherein said upmixing comprises upmixing the first plurality of output audio signals to the second plurality of output audio signals such that the second plurality of output audio signals are downmixable to reconstruct the first plurality of output audio signals.

15. The method of claim 10, wherein said upmixing comprises adaptively enabling and disabling the upmixing of the first plurality of output audio signals into the second plurality of output audio signals based on spatial properties of the first plurality of output audio signals.

16. The method of claim 10, wherein said upmixing comprises upmixing the first plurality of output audio signals to the second plurality of output audio signals in at least one of a time domain or a frequency domain.

17. The method of claim 10, further comprising:

generating the input audio signal by one or more microphones.

18. A non-transitory computer readable storage medium having computer program instructions embodied in said computer readable storage medium for enabling a processor to perform echo cancellation in a system including a plurality of adaptive filters, the computer program instructions including instructions executable to perform operations comprising:

upmixing a first plurality of output audio signals into a second plurality of output audio signals, wherein the second plurality of output audio signals comprises more audio signals than the first plurality of output audio signals, and wherein at least one of the second plurality of output audio signals comprises a combination of at least two output audio signals of the first plurality of output audio signals;

generating an estimated echo for one or more output audio signals of the second plurality of output audio signals by one or more respective adaptive filters each corresponding to a respective one of the one or more output audio signals of the second plurality of output audio signals;

combining the estimated echo associated with each of the second plurality of output audio signals with an input audio signal to generate an echo-cancelled audio signal; and selectively enabling and disabling an adaptive filter associated with one of the second plurality of output audio signals based at least on a characteristic of the one of the second plurality of output audio signals.

19. The non-transitory computer readable storage medium of claim 18, wherein said combining comprises:

combining the estimated echo associated with each of the second plurality of output audio signals to generate a combined echo estimate; and combining the combined echo estimate with the input audio signal to generate the echo-cancelled audio signal.

20. The non-transitory computer readable storage medium of claim 18, wherein the first plurality of output audio signals comprises a left channel signal L and a right channel signal R of a stereo signal, and wherein the second plurality of output audio signals comprises a virtual center channel CC, a modified left channel L', and a modified right channel R'.

* * * * *